Patented Aug. 11, 1942

2,292,708

UNITED STATES PATENT OFFICE 2,292,708

CATALYTIC TREATMENT OF HYDROCARBONS

Julian M. Mavity, Chicago, Ill., assignor to Universal Oil Products Company, Chicago, Ill., a corporation of Delaware No Drawing. Application October 31, 1940, Serial No. 363,683

3 Claims. (Cl. 196—52)

This invention relates to catalytic treatment of hydrocarbon oil to produce a substantial yield of high antiknock gasoline. In general, it is concerned with the treatment of hydrocarbon oil in the presence of catalysts which are generated during the processing and conversion treatment of the hydrocarbons. Petroleum fractions or hydrocarbon oils generally may be processed which do not decompose to a large extent on ordinary vaporization or deposit excessive amounts of carbonaceous material when undergoing catalytic conversion treatment.

In the more conventional methods of catalytic treatment, the catalytic material is formed into granules and contacted with the reacting materials in fixed beds disposed in chambers. The catalyst material may be of a natural origin or it may be a synthetic composition adapted to the type of reaction carried out. Generally speaking, the best catalysts are prepared by synthetic methods and under specific conditions so that the catalysts may not only be active but are also reasonably stable under the conditions employed. The catalysts may also be contacted with the hydrocarbon oil as powders and disposed in the stream of oil under suitable conditions for reaction. In the case of the preparation of silica-alumina type cracking catalysts, precautions must be observed in order to produce highly active catalysts which maintain their activity under high temperature conditions of use and regeneration. Impurities which are ordinarily present in the raw catalyst materials such as alkali metal compounds in silica containing catalysts must be removed in order that the catalyst be free from fusing or sintering tendencies which ruin the catalytic surfaces. In the present invention, a process is provided for producing the highly active and stable catalyst in situ in the presence of the fluids undergoing catalytic treatment.

In one specific embodiment, the present invention comprises disposing in a hydrocarbon oil an alkyl silicate and a metal alkoxide capable of reacting with said alkyl silicate to form a cracking catalyst and subjecting the hydrocarbon oil mixture to conditions of time, temperature and pressure adequate to produce a substantial yield of high antiknock gasoline, separating a mixture of spent catalyst and a non-vaporous oil from vaporous reaction products and recovering said spent catalyst and non-vaporous oil, separately recovering high antiknock gasoline, and returning the said recovered catalyst to the hydrocarbon oil undergoing said catalytic cracking treatment.

In the present invention, materials which combine to form cracking or reforming catalysts are brought together either by introducing them directly into the zone of reaction or by mixing with the oil before it reaches reacting conditions. Thus, for example, various alkyl silicates or borates may be reacted with suitable metal alkoxides such as those of aluminum, zirconium, vanadium, magnesium and thorium to produce silica-metal oxide composites in situ which are highly reactive in cracking and reforming reactions. Ethyl ortho-silicate or other alkyl silicates will react with aluminum alkoxides such as the methyl, ethyl, propyl and butyl alkoxides in the presence of hydrocarbons to yield highly active cracking catalysts. In the case of a small amount of ethylorthosilicate and aluminum butylate mixed with an oil and heated to cracking conditions, the catalyst forms at a temperature of approximately 600–700° F. in a fine state of division distributed throughout the oil. In the process of the invention generally, the catalyst forms in a finely divided condition and a large surface is exposed for influencing the catalytic reactions.

The finely divided catalysts after reaction are usually spent due to contamination of the surfaces by deposits of hydrocarbonaceous matter. The spent catalyst is therefore removed as for example in the non-vaporous residue separated from vaporous reaction products. The non-vaporous residue may be a suspension of catalyst in oil or a substantially dry mixture of catalyst and hydrocarbonaceous material. The oil or oily residue may be separated from the spent catalyst by filtration and/or extraction and the catalyst then recovered by subjecting it to oxidizing conditions to remove the carbonaceous residues intimately distributed throughout the catalytic active surfaces. The spent catalyst may for example be passed continuously through a revolving kiln and heated therein to ignition temperature in the presence of a mixture of flue gas and air, regulating the oxygen content so that the catalyst is regenerated at a temperature within the range of approximately 1000–1600° F. Under these conditions the catalysts can usually be completely regenerated without impairing their activity.

Since the powdered catalyst prepared in situ in the above manner is suitable for repeated regeneration and re-use, the amount of new catalyst which is necessary to carry out the catalytic reactions is relatively small and corresponds to the make-up requirement due to handling losses and the elimination of catalyst having reduced activity. Thus, in some catalytic reactions as in catalytic cracking employing silica-alumina catalyst as prepared above, the catalyst is very rugged and may be regenerated a hundred or more times without a large loss in activity. It is thus apparent that the cost of the catalyst is reduced to small proportions since not more than a few per cent will be added to the regenerated catalyst which is on hand. It is even within the scope of the invention when starting up the process to introduce a powdered catalyst of the type used as, for example, a stable silica-alumina catalyst, and add the make-up catalyst in situ in which event the catalyst prepared according to the invention eventually displaces the catalyst initially introduced into the process.

Various types of hydrocarbon conversion reactions take place in the presence of the powdered cracking and reforming catalysts depending partly upon the temperature, pressure and time conditions, and partly upon the hydrocarbon oil processed. The reactions may include carbon-to-carbon cleavage, isomerization, cyclization, dehydrogenation, hydrogenation, and desulfurization reactions. In the case of higher boiling hydrocarbons, for example, there may be a cleavage of long chain carbon-to-carbon bonds and isomerization reactions may also occur as a result of which the lower boiling hydrocarbons formed are of a more highly branched chain nature. Also hydro-aromatic hydrocarbons present in the oil undergoing decomposition or formed therein by the cyclization of olefins, may undergo dehydrogenation to form aromatic hydrocarbons, and the hydrogen liberated in these reactions may combine with olefinic hydrocarbons present during reaction to form more saturated hydrocarbons. The latter reactions tend to occur at the lower temperatures in the range of operating conditions whereas more unsaturated hydrocarbons, particularly olefins, are produced in large proportions at the higher temperatures employed. The hydrocarbons generally are of a more branched chain structure than is produced in thermal cracking treatment. The temperatures employed may be within the approximate range of 700–1100° F. more or less, and the pressures employed may range from approximately atmospheric to 500 pounds or more per square inch.

The following specific examples are given to illustrate specific applications of the process of the invention, the method of forming a catalyst and the catalyst components. The invention should not be considered as limited to these examples of the process or to the particular catalyst proportions or components since these are given as illustrative of the novelty and utility of the invention.

*Example I*

When dissolving in a Pennsylvania gas oil approximately 5% ethyl orthosilicate and about 1% aluminum n-butylate a clear and homogeneous solution is obtained. When heating in a flask to approximately 600–700° F., the mixture immediately becomes white due to the formation of a precipitate which is evidently a silica-alumina catalyst. Upon continued heating at this temperature and distilling off the light hydrocarbons produced, 50 volume per cent of the oil charged of 400° F. end-point gasoline is formed having an octane number of 80 by the motor method.

*Example II*

In a continuous run a Mid-Continent gas oil of approximately 32° A. P. I. gravity having approximately 3% of ethyl orthosilicate and approximately 1% of aluminum n-butylate in solution is heated in a heating coil to a temperature of approximately 825° F. and at a pressure of approximately 200 pounds per square inch and is directed to a reaction chamber maintained at approximately 50 pounds per square inch pressure. The catalyst is separated with a non-vaporous oil residue and the vaporous reaction products are fractionated to separate hydrocarbons above the gasoline boiling point range, 400° F. end-point gasoline and gaseous hydrocarbons. In a single pass approximately 25 volume percent of gasoline is obtained having an octane number of 77. The gases ae rich in polymerizable olefins and the spent catalyst is separated from the non-vaporous oil and regenerated by oxidation treatment and re-used in the above operation with lesser amounts of added ethyl ortho-silicate and aluminum n-butylate.

I claim as my invention:

1. A process for catalytically converting hydrocarbon oil into high antiknock gasoline which comprises disposing in said hydrocarbon oil an alkyl silicate and a metal alkoxide capable of reacting with said alkyl silicate to form a conversion catalyst in situ and subjecting said hydrocarbon oil mixture to catalytic conversion conditions of time, temperature and pressure adequate to produce a substantial yield of high antiknock gasoline.

2. A process for the catalytic conversion of hydrocarbon oil to produce high antiknock gasoline which comprises mixing with said oil an alkyl silicate and an alkoxy compound of aluminum, and subjecting the mixture to a temperature of from about 600° F. to about 1100° F. and a pressure of from about atmospheric to approximately 500 pounds per square inch.

3. A process for the catalytic conversion of hydrocarbon oil to produce high antiknock gasoline which comprises mixing the said oil with an alkyl silicate and an alkoxy compound of zirconium and subjecting the mixture to a temperature of from about 600° F. to about 1100° F. and a pressure of from about atmospheric to approximately 500 pounds per square inch.

JULIAN M. MAVITY.